United States Patent [19]
Sakakibara et al.

[11] Patent Number: 4,655,735
[45] Date of Patent: Apr. 7, 1987

[54] ENDLESS DRIVING BELT

[75] Inventors: Shiro Sakakibara, Toyokawa; Norio Sobue, Aichi; Yoshinori Miyaishi, Okazaki; Sadahiro Koshiba; Masahiro Hasebe, both of Anjo, all of Japan

[73] Assignee: Aisin-Warner Limited, Japan

[21] Appl. No.: 763,927

[22] Filed: Aug. 8, 1985

[30] Foreign Application Priority Data

Aug. 11, 1984 [JP] Japan .................. 59-168060

[51] Int. Cl.$^4$ .............................. S16G 5/00
[52] U.S. Cl. .................... 474/245; 474/246; 474/214
[58] Field of Search ............... 474/201, 242, 245, 246, 474/214

[56] References Cited

U.S. PATENT DOCUMENTS

| | | | |
|---|---|---|---|
| 4,313,730 | 2/1982 | Cole, Jr. et al. | 474/201 |
| 4,338,081 | 7/1982 | Hattori et al. | 474/201 |
| 4,449,960 | 5/1984 | van der Lely | 474/214 |
| 4,516,965 | 5/1985 | Mott | 474/201 X |

FOREIGN PATENT DOCUMENTS 0073962  3/1983  European Pat. Off. ............ 474/242

Primary Examiner—Stephen J. Novosad
Attorney, Agent, or Firm—Steele, Gould & Fried

[57] ABSTRACT

An endless driving belt of the kind adapted for entrainment between at least two pulleys in a V-belt continuously variable transmission, has a plurality of links; means for connecting each link to a next link to enable articulated movement of the links; a plurality of primary blocks engaging the links and positioned one each between adjacent pins; a plurality of secondary blocks disposed one each between adjacent primary blocks and radially supported by one of the pins to provide a clearance preventing engagement with the links, the primary and secondary blocks being engageable with one another; and, the secondary blocks having side surfaces for engaging the entrained pulleys and the primary blocks having side surfaces adapted to avoid engagement with the entrained pulleys, radially and outwardly directed driving forces being transmitted from a driving pulley to the secondary blocks and from the secondary blocks to the pins, the links being driven only by nonradially directed forces, whereby the radially and outwardly directed forces transmitted by the driving pulley are transmitted to the pins and not to the links, enhancing durability of the links.

7 Claims, 47 Drawing Figures

FIG. 4
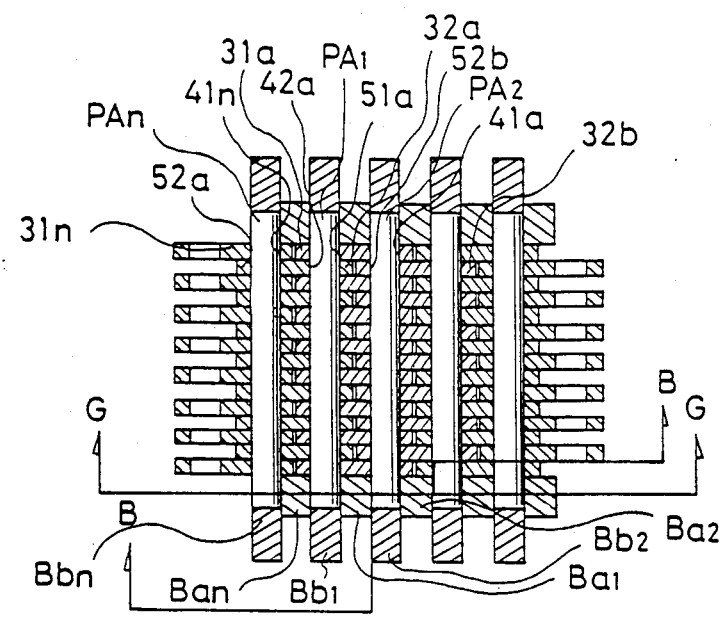
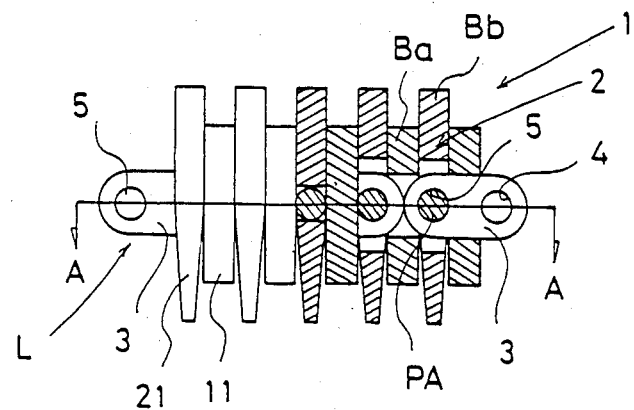
FIG. 5

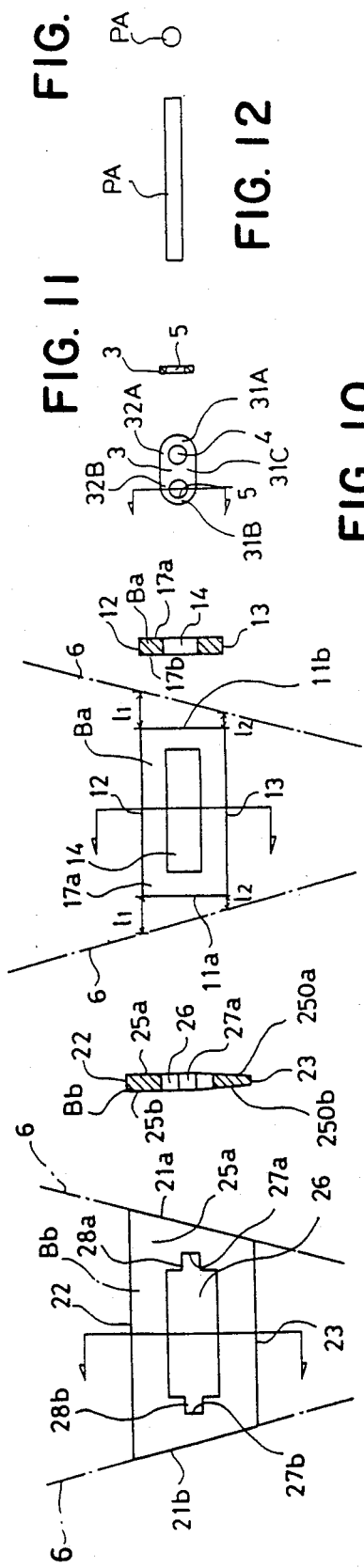

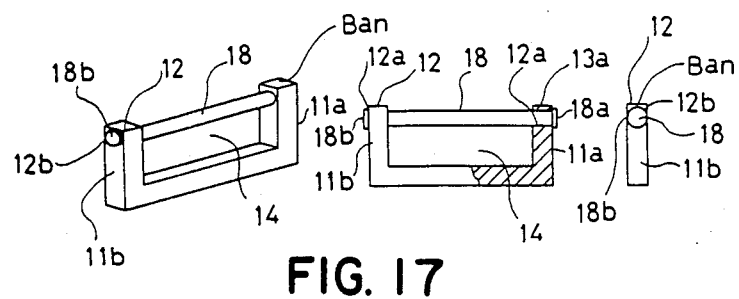

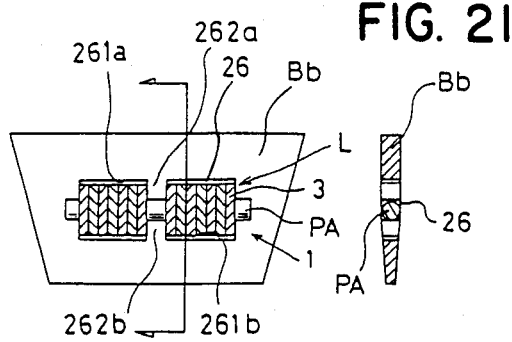
FIG. 20
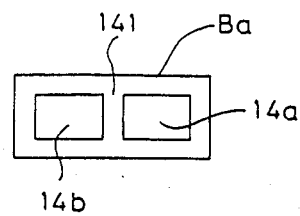
FIG. 21
FIG. 22
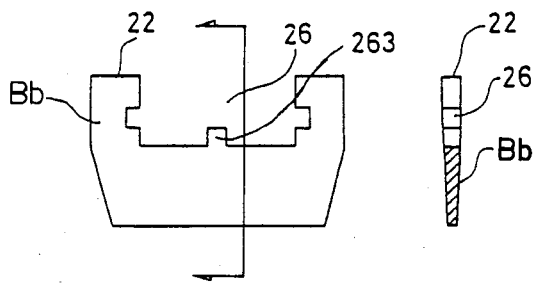
FIG. 23   FIG. 24
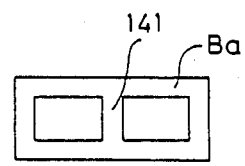
FIG. 25
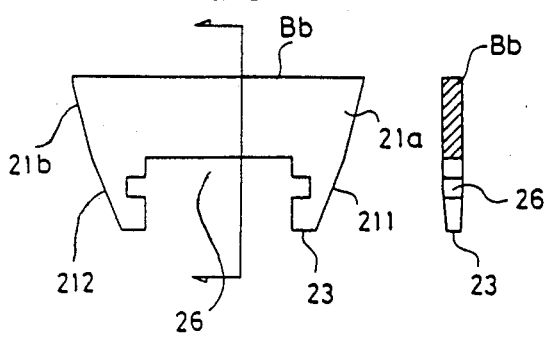
FIG. 26   FIG. 27
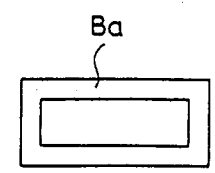
FIG. 28

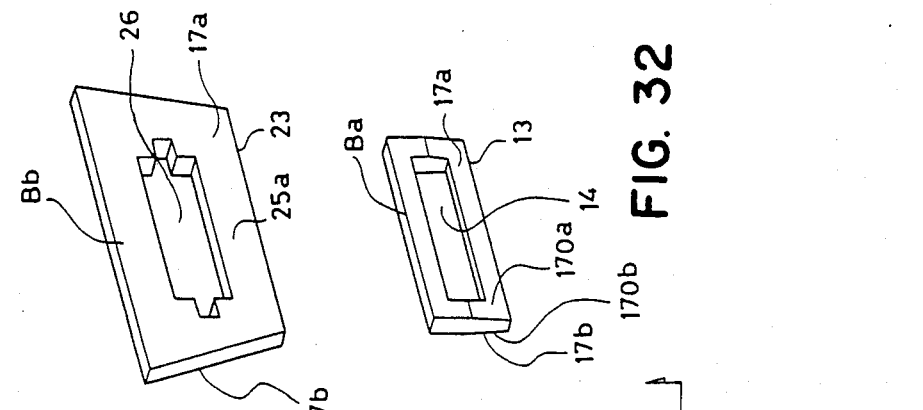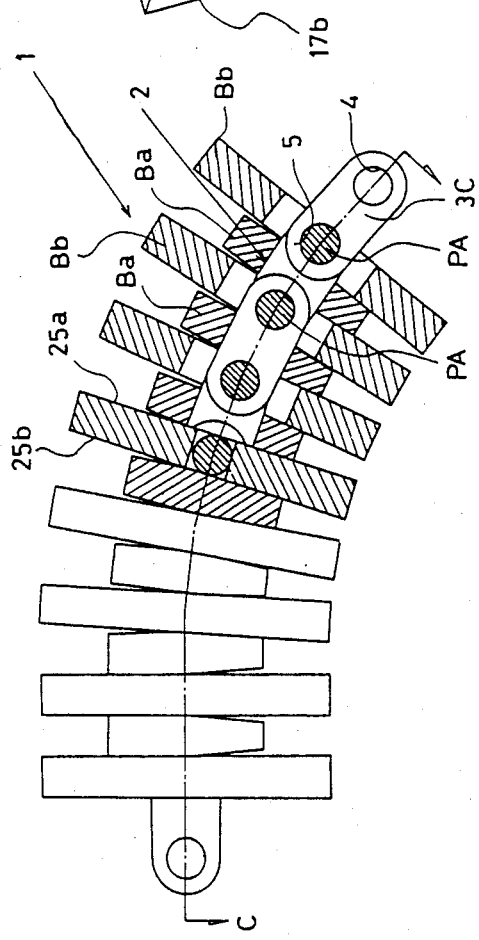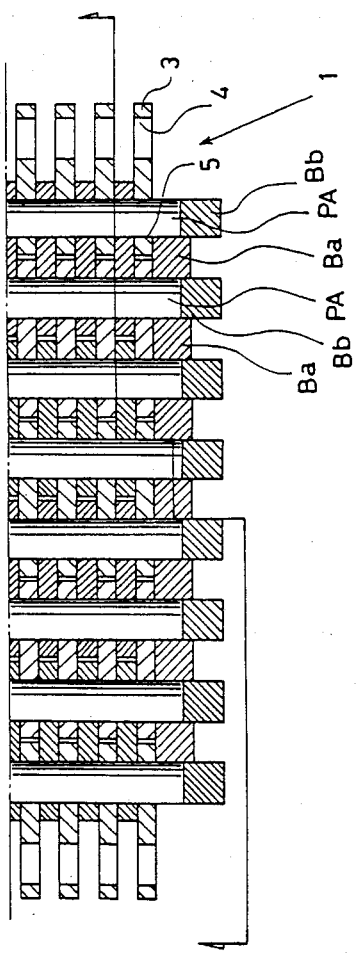

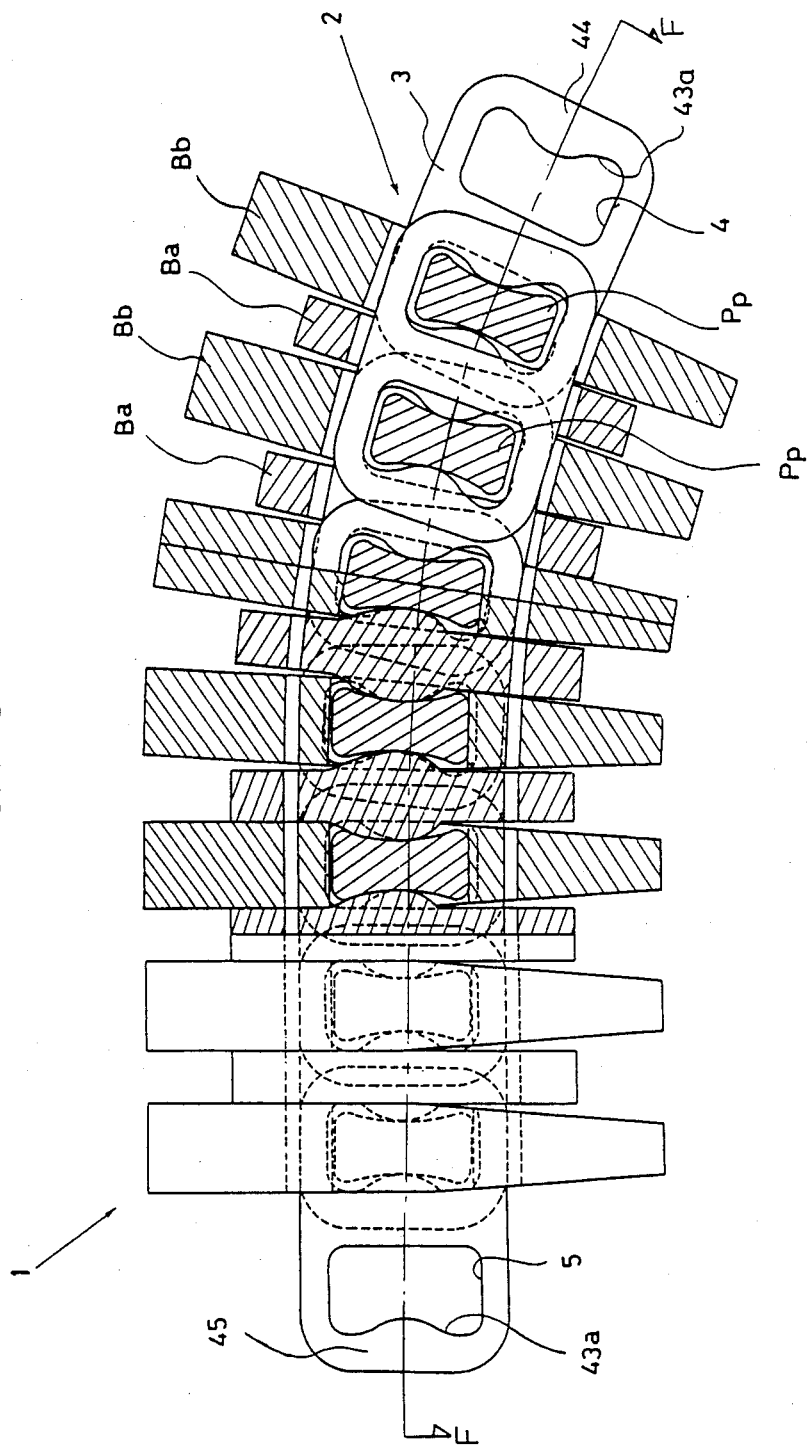

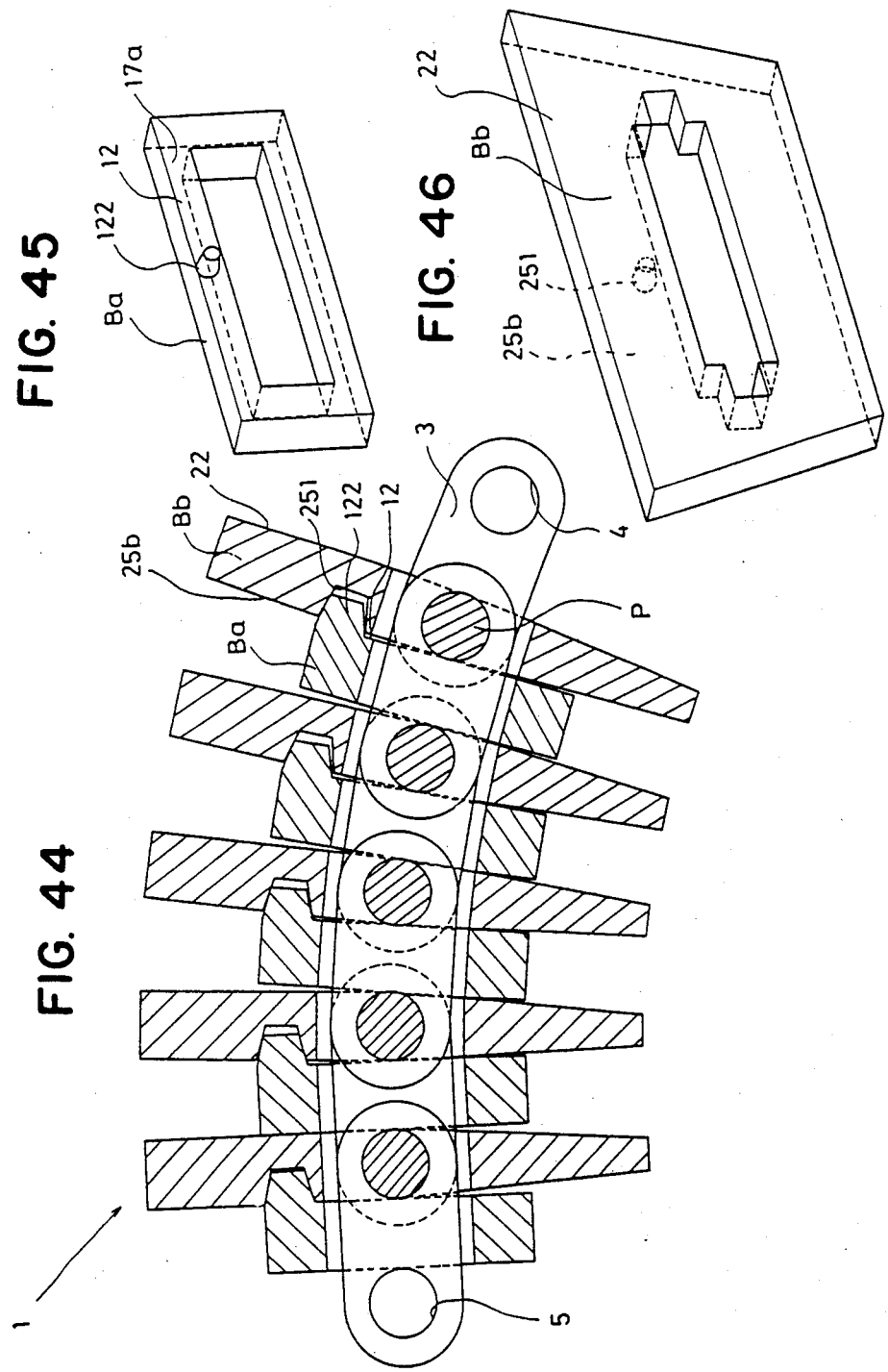

ENDLESS DRIVING BELT

BACKGROUND OF THE INVENTION

1. Field of the Invention

The invention relates to an endless driving belt for a V-belt type continuously variable transmission.

2. Description of the Prior Art

A driving endless belt has been proposed and disclosed in U.S. Pat. No. 4,313,730, which comprises a plurality of sets of links stacked one on another, a pin for connecting each set of links to the adjacent set of links, a primary load block located between the adjacent pins to surround each set of links and having sides shaped to extend outwardly beyond the links and to come into contact with drive means, and a secondary load block located between the adjacent primary load blocks to surround each set of links and having sides shaped to extend further outwardly from the pin and to come into contact with the drive means, wherein the primary load block is shaped to have front and rear converging surfaces, thereby providing an articulated action.

In this driving endless belt, however, the primary and secondary blocks are both in conatct with the drive means, and the contact portion between the primary block held between the adjacent pins and the link is subjected to a concentrated radial and outward load, resulting in deteriorated durability of the link.

SUMMARY OF THE INVENTION

It is therefore an object of the invention to provide a driving endless belt wherein radial and outward loads applied on the blocks from the drive means are all received by pins, thereby improving the durability of the link.

According to the invention, and with reference to FIGS. 1-5, this object is accomplished by providing a driving endless belt which comprises: a plurality of links L, each consisting of link pieces 3 stacked one on another; connecting means PA for connecting each link L to the adjacent link to enable the articulated motion of said links L; a primary block Ba held between the adjacent connecting means and having side surfaces 11 formed not to come into contact with a V-belt type continuously variable transmission pulley (not shown) as a drive means; and, a secondary block Bb mounted between the adjacent primary blocks Ba to cover the connecting means PA and to extend outwardly from the connecting means PA and having sides 21 formed to come into contact with the drive means.

With this arrangement, the input pulley clamps the secondary block Bb1 to transmit a torque, and the secondary block Bb1 urges the pin P2 through the primary block Ba1. The torque is then transmitted from the pin P2 to the output pulley by a chain mechanism 2. The pin P1 receives a force or outward concentrating load applied to expel the secondary block Bb1 radially and outwardly. For this reason, the link L may not receive the outward concentrating load and therefore has improved durability.

The pulling force by the torque transmitted from the input pulley causes the pin P3 to be pulled and the primary block Ba2 to be urged, so that the primary block allows the torque to be transmitted to the output pulley clamping the secondary block Bb3.

BRIEF DESCRIPTION OF THE DRAWINGS

These and other objects, features and advantages of the invention will become apparent from the following description of preferred embodiments and the accompanying drawings in which:

FIG. 4 is a sectional view taken along the line A—A of FIG. 5;

FIG. 5 is a sectional view taken along the line B—B of FIG. 4;

FIGS. 6 and 7 are front and sectional side views respectively of a secondary block in the driving endless belt of the first embodiment;

FIGS. 8 and 9 are front and sectional side views respectively of a primary block in the driving endless belt of the first embodiment;

FIGS. 10 and 11 are front and sectional side views respectively of a link piece of a link in the driving endless belt of the first embodiment;

FIGS. 12 and 13 are front and sectional side views respectively of a columnar pin in the driving endless belt of the first embodiment;

FIGS. 14, 15 and 16 are perspective, front and sectional side views respectively of a final primary block in the driving endless belt;

FIG. 17 is a front view of another final primary block in the driving endless belt;

FIG. 18 is a front view of the final secondary block in the driving endless belt;

FIG. 19 is a front view of another final secondary block in the driving endless belt;

FIGS. 20 and 21 are front and sectional side views respectively of a driving endless belt according to a second embodiment of the present invention;

FIG. 22 is a front view of a primary block in the second embodiement;

FIGS. 23 and 24 are front and sectional side views respectively of a secondary block in a driving endless belt according to a third embodiment of the present invention;

FIG. 25 is a front view of a primary block in the third embodiment;

FIGS. 26 and 27 are front and sectional side views respectively of a secondary block in a driving endless belt according to a fourth embodiment of the present invention;

FIG. 28 is a front view of a primary block in the fourth embodiment;

FIG. 29 is a side view of a driving endless belt according to a fifth embodiment of the present invention;

FIG. 30 is a sectional view taken along the line C—C of FIG. 29;

FIG. 31 is a perspective view of a secondary block in the fifth embodiment;

FIG. 32 is a perspective view of a primary block in the fifth embodiment;

FIG. 43 is a sectional view taken along the line E—E of FIG. 40;

FIG. 44 is a sectional side view of a driving endless belt according to a ninth embodiment of the invention;

FIG. 45 is a perspective view of a primary block in the ninth embodiment;

FIG. 46 is a perspective view of a secondary block in the ninth embodiment; and, FIG. 47 is a front view of a secondary block in a driving endless belt according to a tenth embodiment of the present invention.

DETAILED DESCRIPTION OF PREFERRED EMBODIMENTS

Figure 1:
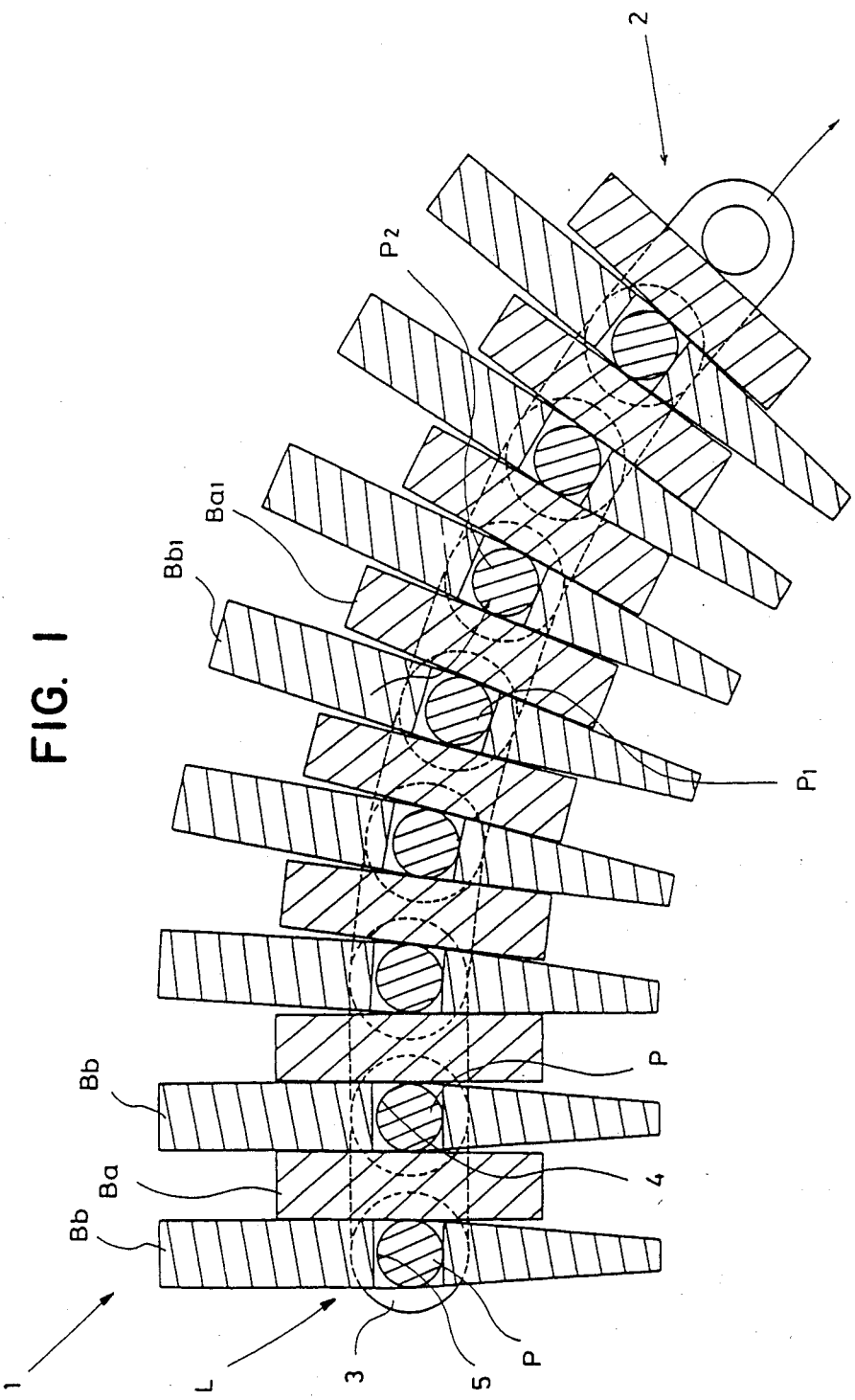
FIGS. 1 and 2 are sectional views of a driving endless belt according to the present invention, taken along the line G—G of FIG. 4.
Figure 2:
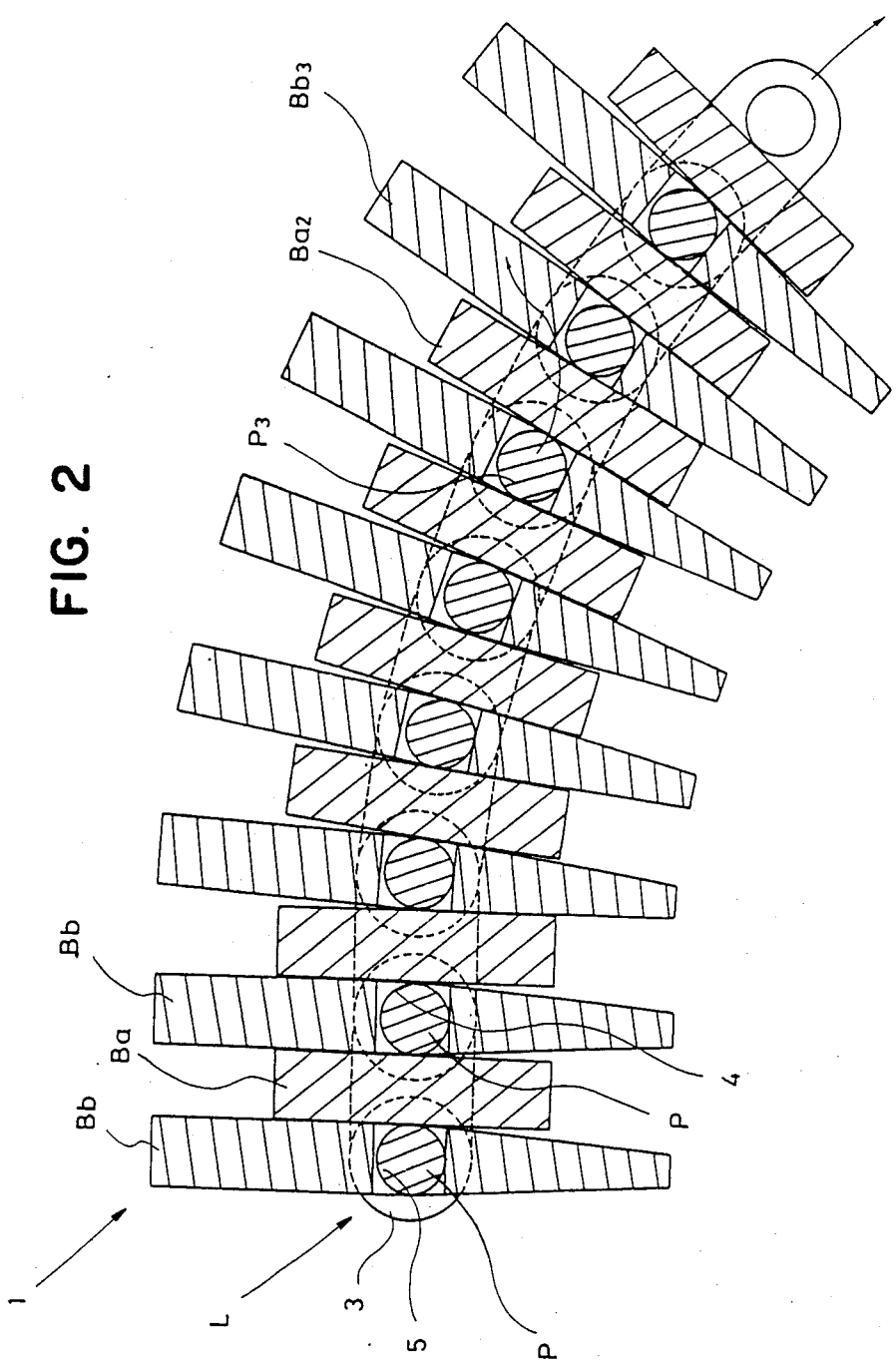

Referring to drawings, particularly to FIGS. 1 to 13, there is shown a driving endless belt 1 according to a first embodiment of the invention. The driving endless belt 1 comprises a chain mechanism 2 connected in an endless manner which is comprised of links L and columnar pins PA for pivotally connecting these links L together. Each the links L consists of a number of link pieces 3 each having a first pin hole 4 and a second pin hole 5 and stacked one on another with the pin holes 4 and 5 aligned with one another. The driving endless belt 1 further comprises a primary block Ba fitted between the adjacent pins PA of the chain mechanism 2 and a secondary block Bb fitted over each pin PA. The blocks Ba and Bb are made of a metal, a synthetic resin or ceramics.

Figure 3:
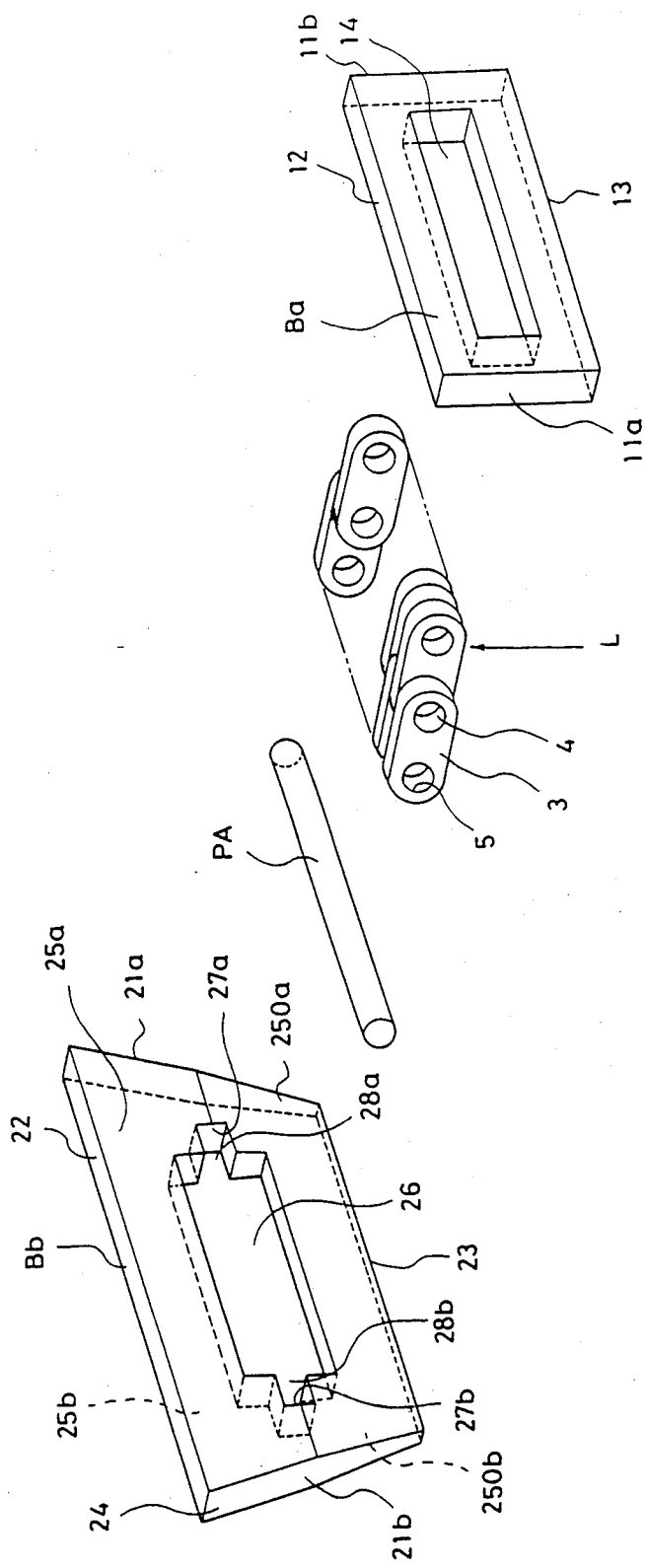
FIG. 3 is an exploded view of a driving endless belt according to a first embodiment of the present invention.
Figure 35:
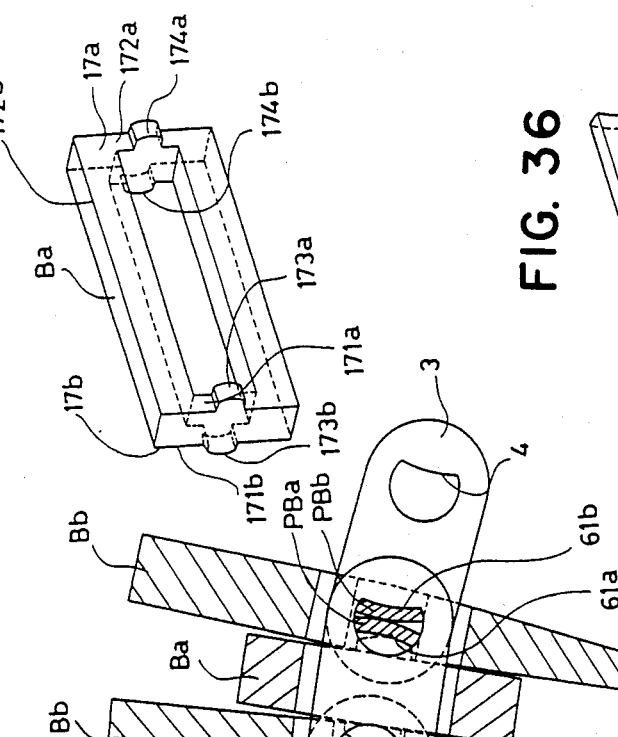
FIG. 35 is a perspective view of a primary block in the sixth embodiment.
Figure 36:
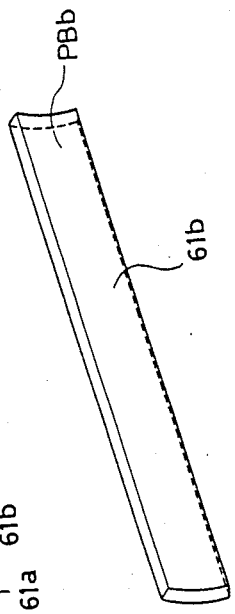
FIG. 36 is a perspective view of a rolling contact pin in the sixth embodiment.
Figure 33:
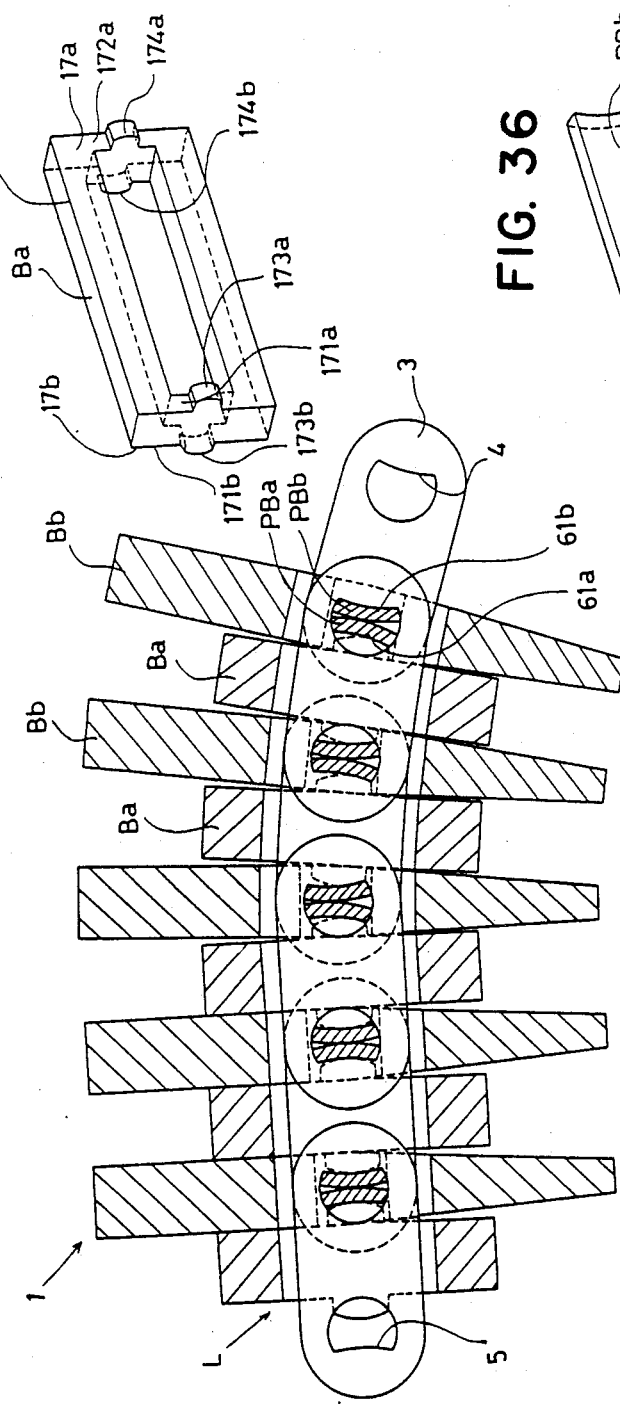
FIG. 33 is a sectional side view of a driving endless belt according to a sixth embodiment of the present invention.
Figure 34:
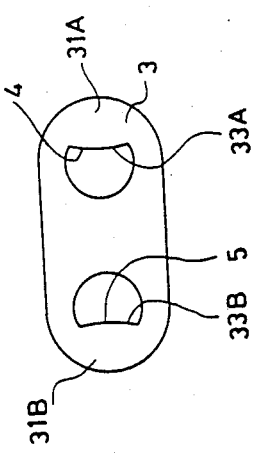
FIG. 34 is a front view of a link piece in the sixth embodiment.

The primary block Ba, as shown in FIGS. 3, 8 and 9, is rectangular, having opposite (laterally outwardly facing) side surfaces 11a and 11b and upper and lower surfaces 12 and 13. The laterally outermost edges of upper surface 12 are spaced from the conical contact surfaces 6 (dash-dot lines in FIGS. 6 and 8) of a pulley (not shown) by a gap $L_1$. The laterally outermost edges of lower surface 13 are spaced from the conical contact surfaces 6 of the pulley by a gap $L_2$. As shown, gap $L_1$ is larger than gap $L_2$. The pulley is a drive means for a V-belt in a continuously variable transmission. The primary block Ba is therefore out of contact with the conical contact surface 6 of the pulley. A link insert hole 14, through which the link L is inserted, is made in the primary block Ba at its central portion, and is rectangular in a direction of connecting links L together.

As shown in FIGS. 3, 6 and 7, the secondary block Bb is of a trapezoidal configuration with its opposite side surfaces 21a and 21b respectively formed into an inclined contact surfaces 24 reducing in width from the edge of upper surface 22 toward the edge of lower surface 23. Contact surfaces 24 engage the conical contact surfaces 6 of the pulley, and are thick enough to form first and second linking surfaces 25a and 25b which come in contact with the second and first linking surfaces 17a and 17b (FIGS. 8 and 9) of the primary block Ba. The first and second linking surfaces 25a and 25b are formed with lower tapered surfaces 250a and 250b converging toward the center to enable the articulated movement of the driving endless belt 1. A rectangular link insert hole 26 through which a link L is inserted is made to extend from the first linking surface 25a to the second linking surface 25b. At the central and laterally opposite inner side walls 27a and 27b of the hole 26, pin locking recesses 28a and 28b are defined integrally with the link insert hole 26.

The link L comprises a number of link pieces 3 which are arranged in a row in the thickness-wise direction (laterally). Each link piece 3 is made of a thin metallic plate and has the first pin hole 4 and second pin hole 5 perforated at the opposite ends thereof, as shown in FIGS. 3, 5, 10 and 11. The link L is fitted at its central portion into the link insert hole 14 of one primary block Ba, at its opposite ends into the respective holes 14 of the two primary blocks Ba on the opposite side of the one primary block Ba and at its first and second pin hole portions 32A and 32B into the link insert holes 26 of the adjacent secondary blocks Bb on the opposite side of the one primary block Ba, respectively. A number of the link pieces 3 of the links L are arranged in a row in the thickness-wise direction, stacked one on another with the first and second pin holes 4 and 5 aligned together. The link pieces are pivotally connected together by the columnar pins PA, which have a curved surface around the outer periphery and are respecitively inserted through the first and second pin holes 4 and 5, thus constituting the endless belt-like chain mechanism 2. The width of the link piece 3 is set slightly smaller than the distances between the upper and lower ends or surfaces 12 and 13; 22 and 23 in the link insert holes 14 and 26 of the first and secondary blocks Ba and Bb. The number of the link pieces 3 having the columnar pins PA fitted into the first pin holes 4 thereof are inserted through the link insert holes 14 and 26 of the primary and secondary blocks Ba and Bb to connect one secondary block Bb and to connect one primary block Ba between the adjacent pins PA of the links L, for every pin PA. The distance between the first and second pin holes 4 and 5 of each link piece 3 is set such that when the pins PA are respectively fitted into the first and second pin holes 4 and 5, the respective pin PA are locked in the pin locking recesses 28a and 28b to hold the secondary block Bb, thereby preventing the primary and secondary blocks Ba and Bb from falling off.

The columnar pin PA, as shown in FIGS. 3, 5, 12 and 13, has a width and external configuration matched with the pin locking recesses 28a and 28b of the secondary block Bb.

The driving endless belt 1 according to this embodiment, with reference to FIG. 4, in which the primary and secondary blocks Ba and Bb are connected to the chain mechanism 2 constituted by the links L and columnar pins PA, is assembled as follows.

(a) Firstly, the second pin hole 51a of a first layer link piece 31a in a first stack is aligned with the first pin hole 42a of a first layer link piece 32a in a second stack to pivotally connect the link pieces 31a and 32a with each other by a first columnar pin PA1 inserted through the aligned pin holes. A first secondary block Bb1 is fitted on the pin PA1 from the side of the first pin hole 41a of the first layer link piece 31a in the first stack to lock the pin PA1, and a first primary block Ba1 is further fitted on the first layer link piece 31a in the first stack.

(b) Then, the first pin hole 41a of the first layer link piece 31a in the first stack is aligned with the second pin hole 52b of a second layer link piece 32b in the second stack to pivotally connect the link pieces 31a and 32b by a second columnar pin PA2 inserted through the aligned pin holes 41a and 52b. A secondary block Bb2 is fitted on the second layer link piece 32b in the second stack in the same direction as in the first primary and secondary blocks Ba1 and Bb1, the second primary block Ba2 is fitted on the second layer link piece 32b in the second stack.

(c) The above procedure is repeated until final layer link piece 31n in the first stack is mounted. Then, any one of final secondary and primary blocks Bbn and Ban is fitted on the final layer link piece 31n in the first stack, and the first pin hole 41n of the final layer link piece 31n in the first stack is aligned with the second pin hole 52a of the first layer link piece 32a in the second stack to pivotally connect the link pieces 31n and 32a. Thereafter, a special final primary block or secondary block, which will be described hereinafter, is assembled.

The special final primary and secondary blocks Ban and Bbn used in this embodiment are shown in FIGS. 14 to 19.

A first kind of final primary block Ban, as shown in FIGS. 14 to 16, may be made by cutting off a central portion of an upper surface 12 to open a link insert hole 14. Then, circular holes 12a and 12b are made in the side surfaces 11a and 11b, respectively, near upper surface 12. A round bar 18 is inserted through the circular holes 12a ad 12b, and caulked at its opposite ends 18a and 18b.

Alternatively, another kind of final primary block Ban, as shown in FIG. 17, may be made by projecting an upper round bar 19A and a lower round bar 19B from a second side portion 19b and fitting them into round holes 191 and 192 of a first side portion 19a. Then, fitted portions 193 and 194 are bonded by suitable means such as welding. The distance between the upper and lower round bars 19A and 19B is similar to that between the upper and lower surfaces 12 and 13.

In a final secondary block Bbn, as shown in FIG. 18, a central portion 121 of the upper part of the block is formed separately. After the main body is mounted on the link L, the central portion 121 is fitted back in place and bonded thereto by suitable means such as welding.

Alternatively, a another kind of final secondary block Bbn having another shape, may be made as shown in FIG. 19. A central portion of the upper part 22 is cut off to open a link insert hole 26. Recesses 22A and 22B are made near the upper edges of side surfaces 21a and 21b, respectively, and circualr holes 22a and 22b are made in the recesses. A round bar 29 is inserted through the circular holes 22a and 22b, and caulked at its opposite ends 29a and 29b.

FIGS. 20 to 22 show a second embodiment of the present invention.

In this embodiment, a partition 141 is formed to divide the link insert hole 14 of a primary block Ba into first and second hole portions 14a and 14b. Projections 262a and 262b are formed and projected from the inner walls 261a and 261b in the link insert hole of the link piece 3 of link L in the secondary block Bb. The distance between the projections 262a and 262b corresponds to the diameter of the pin PA.

FIGS. 23 to 25 illustrate a third embodiment of the present invention.

In this embodiment, a primary block Ba is similar to that shown in FIG. 22, and a secondary block Bb is made in the following manner. A central portion of the upper part 22 is cut off to open the link insert hole 26, and a projection 263 is formed in the link insert hole 26.

In the above described second and third embodiments, the the pin of the chain link and the block abut or engage at three points, and such an increase in the number of abutment points causes the surface pressure at each of the abutment portions of the pin and block to be lowered, which improves durability.

FIGS. 26 to 28 show a fourth embodiment of the present invention.

In this embodiment, a first block Ba is similar to that of the first embodiment, and a secondary block Bb is made by cutting off a portion of the lower 23 at its center to make the link insert hole 26 and forming notches 211 and 212 at the side surfaces 21a and 21b.

FIGS. 29 to 32 show a fifth embodiment of the present invention.

In this embodiment, tapered surfaces 170a and 170b are formed on the lower part of the first and second linking surfaces 17a and 17b of the primary block Ba in the first embodiment, and the tapered surfaces are eliminated of the lower part of the first and second linking surfaces 25a and 25b of the secondary block Bb. In these figures, the same parts as in the first embodiment are designated by the same reference characters.

FIGS. 33 to 36 show a sixth embodiment of the present invention.

In this embodiment, projections 173a, 173b, 174a and 174b extend in the linking direction from the opposite side edges 171a, 171b, 172a and 172b of the first and second linking surfaces 17a and 17b of the primary block Ba and have curved surfaces adapted to abut against recessed surfaces 61a and 61b of rolling contact pins PBa and PBb each having a circularly arcuate curved surface, respectively. The first and second pin holes 4 and 5 are shaped such that the pin hole walls 33A and 33B of the opposite ends 31A and 31B as in the first embodiment correspond to the recessed surfaces 61a and 61b of the rolling contact pins PBa and PBb. While the link coupling is conducted by one pin in the first embodiment, such coupling is conducted by a pair of rolling contact pins PBa and PBb in this embodiment. The rotation between the rolling contact pins PBa and PBb is provided by the rolling, leading to a less friction and an improved durability. The projections 173a, 173b, 174a and 174b are adapted to abut against the contact pins PBa and PBb to support the primary block Ba and to prevent it from coming into contact with the link L, so that the link L may be kept from directly receiving the centrifugal force (that is, the inertial force due to centripetal acceleration) applied on the primary block Ba. This results in an improved durability of the link.

Figure 37:
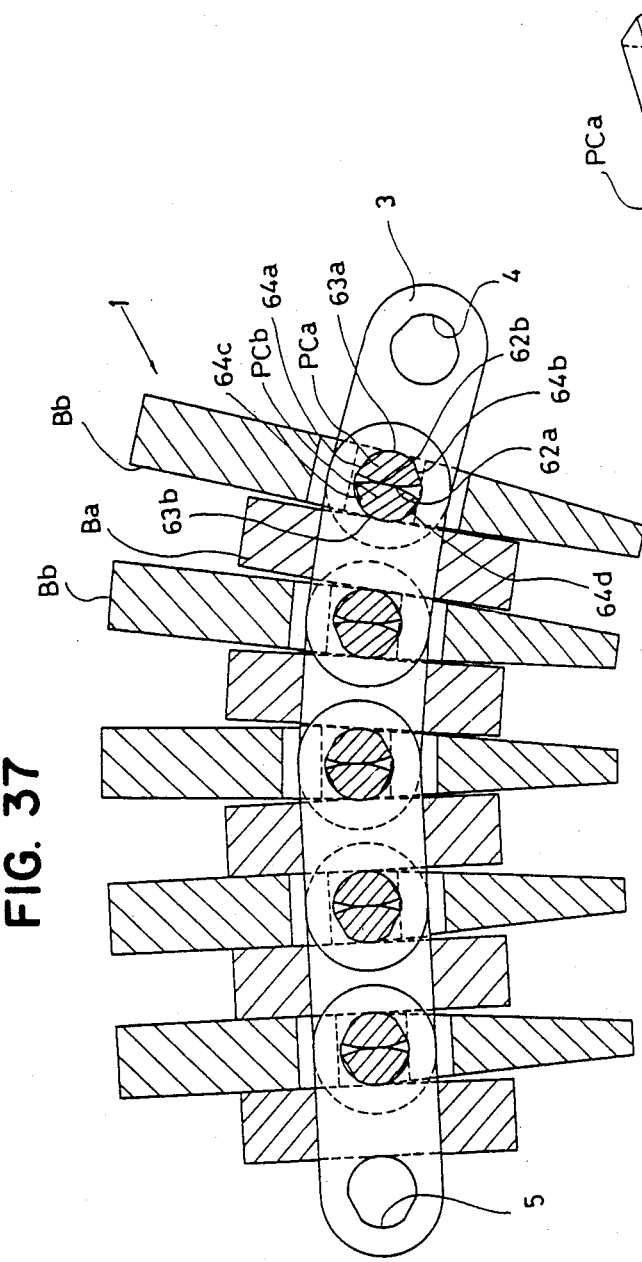
FIG. 37 is a sectional side view of a driving endless belt according to a seventh embodiment of the present invention.
Figure 39:
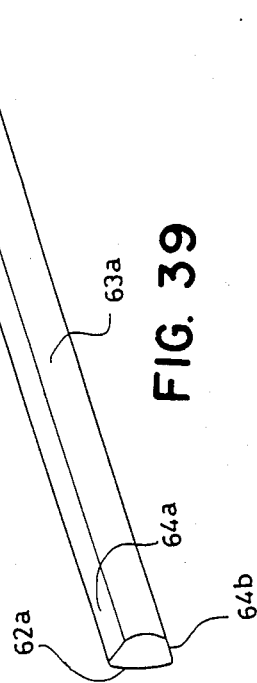
FIG. 39 is a rolling contact pin in the seventh embodiment.
Figure 38:
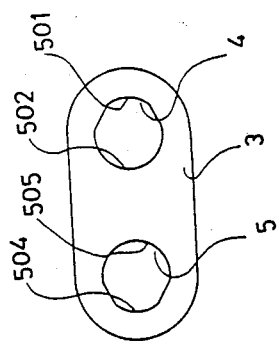
FIG. 38 is a front view of a link piece in the seventh embodiment.
Figure 42:
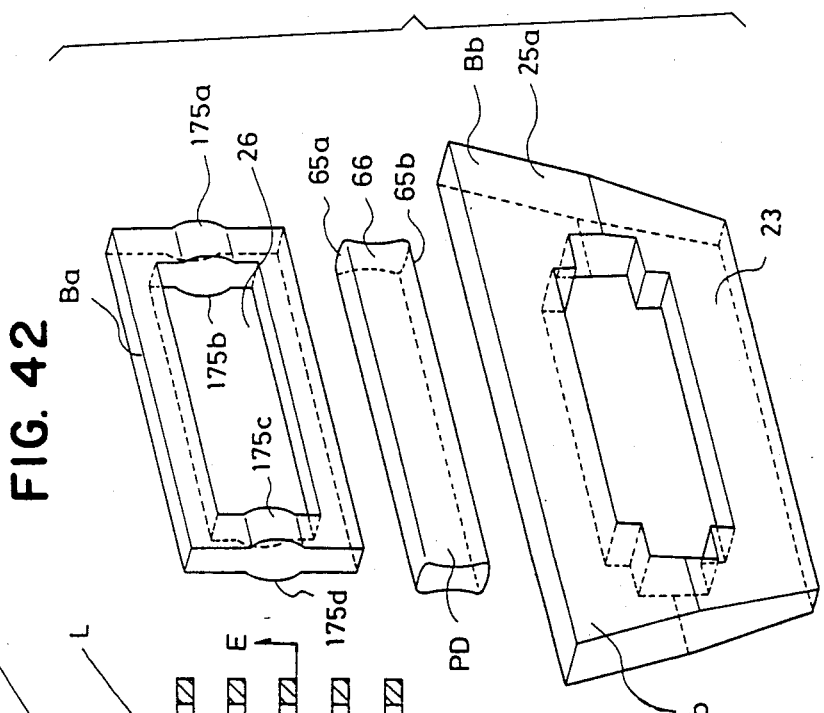
FIG. 42 is an exploded view of the driving endless belt of the eighth embodiment.
Figure 40:
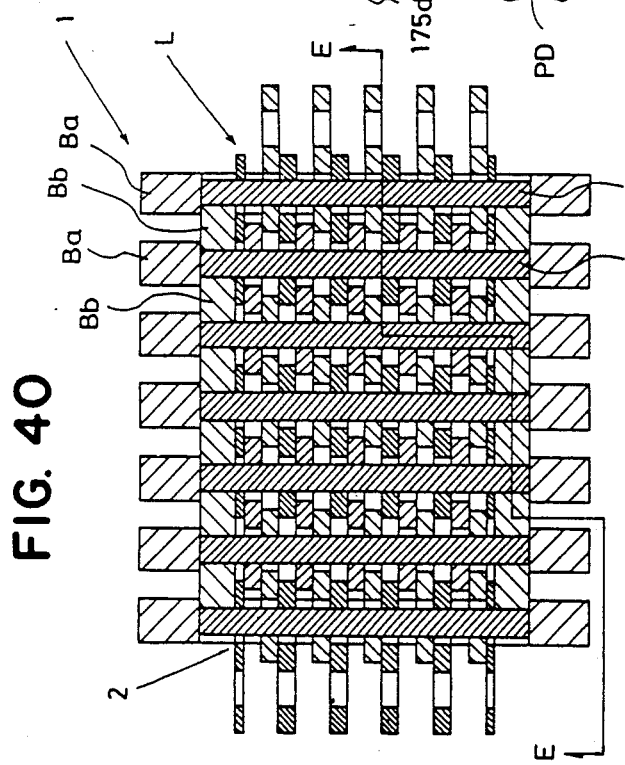
FIG. 40 is a sectional side view of a driving endless belt according to a eighth embodiment of the present invention, taken along the line F—F of FIG. 43.
Figure 41:
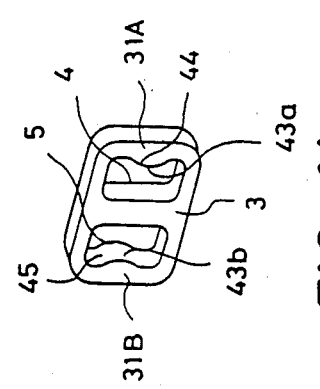
FIG. 41 is a perspective view of a link piece in the eighth embodiment.

FIGS. 37 to 39 show seventh embodiment of the present invention.

In this embodiment, a rolling contact pin PCa, PCb has an abuting curved surface 61a, 62b and a curved surface 63a, 63b having the same configuration as a curved wall 501, 504 of the first or second pin hole 4 or 5 of the link piece 3, both the curved surfaces 62a (62b) and 63a (63b) being connected with each other by planar surfaces 64a and 64b (64c and 64d). The same parts as in the first embodiment are denoted by the same reference numbers.

In this embodiment, the curved surface 63a (63b) of the rolling contact pin PCa (PCb) is formed over a range to provide the contact with the primary block Ba. In addition, the planar surfaces 64a and 64b (64c and 64d) are provided for the purpose of preventing the rotationally sliding movement of the pin PCa (PCb) on the link 3.

FIGS. 40 to 43 show a eighth embodiment of the present invention.

In this embodiment, a primary block Ba includes projections in the form of projections 175a, 175b, 175c and 175d each having a curved surface, and a rod-like pin PD has a central portion 66 of a smaller diameter than those of radially opposite ends 65a and 65b and gradually decreases in diameter from the opposite ends 65a and 65b to the central portion 66. The central portion 66 is adapted to abut against the curved projections 175a, 175b, 175c and 175d to support the primary block Ba, so that the link L may not be brought into direct contact with the primary block Ba. The link piece 3 of the link L has projections 44 and 45 each having a curved surface, which projections 44 and 45 are respectively formed on the inner walls 43a and 43b of the first and second pin holes 4 and 5 at the opposite ends 31A and 31B and are brought into rolling contact with the central portion 66 of the rod-like pin PD to enable an articulative motion.

FIGS. 44 to 46 illustrate a ninth embodiment of the invention.

In this embodiment, a primary block Ba has, at the first linking surface 17a of its upper end edge 12, a pawl 122 which is fitted into a bore 251 made in the second linking surface 25b of the upper part 22 of the secondary block Bb. Therefore, the primary block Ba is held by the secondary block Bb, and the centrifugal force and self-weight of the primary block Ba can not be applied on the link L and hence, the durability of the link L is improved.

Figure 47:
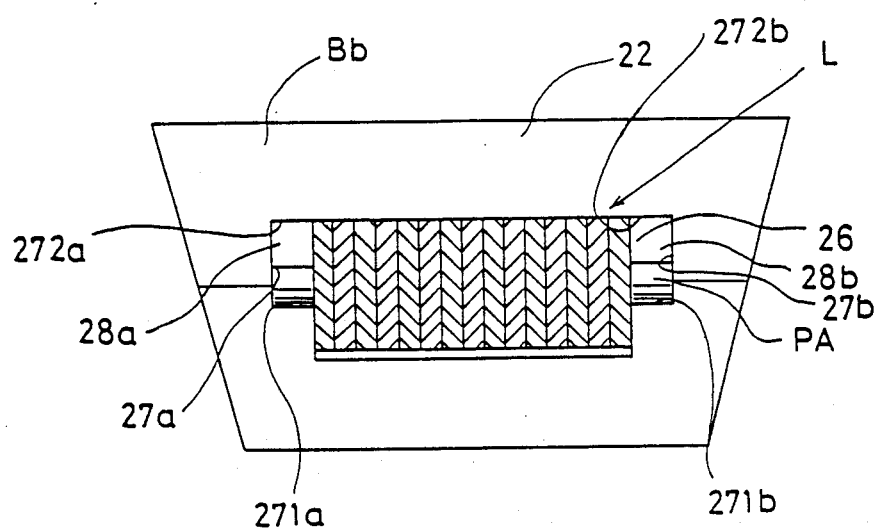

FIG. 47 shows a tenth embodiment of the present invention.

In this embodiment, the secondary block Bb has an area which serves as a part of the link insert hole 26 and extends on the side of the upper part 22 from the pin locking recesses 28a and 28b for receiving the columnar pin PA to fit it onto the opposite inner walls 27a and 27b at the center of the link insert hole 26. When the secondary block Bb receives the transmitting load from the pulley, it is supported with the lower surfaces 271a and 271b of the opposite inner walls 27a and 27b abutting against the columnar pin PA, and when the secondary block Bb receives no transmitting load from the pulley, it is supported with the upper surfaces 272a and 272b of the opposite inner walls 27a and 27b being in contact with the link L.

The link insert hole 26 is easy to perforate in this embodiment.

What is claimed is:

1. An endless driving belt of the kind adapted for entrainment between at least two pulleys in a V-belt continuously variable transmission, the endless belt comprising:

a plurality of links;
means for connecting each link to a next link to enable articulated movement of the links;
a plurality of primary blocks engaging the links and positioned one each between adjacent pins;
a plurality of secondary blocks disposed one each between adjacent primary blocks and radially supported by one of the pins to provide a clearance preventing engagement with the links, the primary and secondary blocks being engageable with one another; and
the secondary blocks having side surfaces for engaging the entrained pulleys and the primary blocks having side surfaces adapted to avoid engagement with the entrained pulleys, radially and outwardly directed driving forces being transmitted from a driving pulley to the secondary blocks and from the secondary blocks to the pins, the links being driven only by nonradially directed forces, whereby the radially and outwardly directed forces transmitted by the driving pulley are transmitted to the pins and not to the links, enhancing durability of the links.

2. An endless driving belt according to claim 1, wherein:
each of the primary blocks comprises at least one projection extending from at least one of the front and rear of the nonengaging sides and spaced from the links; and,
the pins comprise recesses engageable with the projections.

3. An endless driving belt according to claim 1, wherein:
each of the primary blocks comprises at least one projection extending from at least one of the front and rear of the nonengaging sides and spaced from the links; and,
each of the secondary blocks comprises a recess engageable with one of the projections.

4. An endless driving belt according to claim 1, wherein the pins comprises columnar pins.

5. An endless driving belt according to claim 1, wherein the pins comprises pairs of rolling contact pins.

6. An endless driving belt according to claim 1, wherein the pins comprises rod-like pins.

7. An endless driving belt according to claim 1, wherein at least one of the primary and secondary blocks comprises a tapered portion to facilitate the articulated movement.

* * * * *